United States Patent [19]

Cochcroft, Jr. et al.

[11] Patent Number: 4,488,222
[45] Date of Patent: Dec. 11, 1984

[54] CIRCUIT FOR REUSING PREVIOUSLY FETCHED DATA

[75] Inventors: Arthur F. Cochcroft, Jr., Lexington; James M. Lockwood, West Columbia, both of S.C.

[73] Assignee: NCR Corporation, Dayton, Ohio

[21] Appl. No.: 376,893

[22] Filed: May 10, 1982

[51] Int. Cl.³ .............................................. G06F 1/00
[52] U.S. Cl. .............................................. 364/200
[58] Field of Search ....................... 364/200 MS File

[56] References Cited
U.S. PATENT DOCUMENTS
4,156,905 5/1979 Fassbender ....................... 364/200

Primary Examiner—Raulfe B. Zache
Attorney, Agent, or Firm—J. T. Cavender; Edward Dugas

[57] ABSTRACT

A memory addressing system includes an addressable memory provided with error checking and correction (ECC) circuits which include output latches adapted to latch corrected data read from the memory. An applied memory address is compared in a comparator with a previous memory address stored in an address latch and if a match is detected, a match signal is effective to inhibit the occurrence of the next memory cycle and to activate a decoder coupled to the output of the ECC circuits to cause transfer to the system bus of selected data from the ECC latches. If no match is detected, a memory cycle is initiated to access the desired data in the memory. A high-speed memory operation is thus achieved utilizing simple circuitry.

9 Claims, 4 Drawing Figures

CIRCUIT FOR REUSING PREVIOUSLY FETCHED DATA

BACKGROUND OF THE INVENTION

This invention relates to computer systems and more particularly, to the pre-fetching of data from a computer system having error checking and correcting features.

In order to reduce memory overhead in memory systems with error checking and correction, a wide memory word is desirable. For a 256K byte system with double bit error detection and single bit error correction, implemented with 64K bit dynamic RAM, a total of 44 dynamic RAM devices are required if a 16 bit wide word is used, while only 39 dynamic RAM devices are required if a 32 bit word is used. In addition to requiring extra memory devices, error correcting memories are inherently slower than comparable width non-error correcting memories constructed from equivalent devices because of the checking time required for each read cycle. Further, if the memory word is wider than the processor data path, as is desirable for reducing memory chip overhead, then all memory write cycles are required to read-modify-write (R-M-W) cycles. R-M-W cycles take approximately twice the time to complete as simple write cycles on non-ECC memories and have an additional adverse impact on the performance of an ECC Memory System.

The present invention directs itself to overcoming the performance degradation due to the 32 bit wide memory word. Performance for the 32 bit wide memory can be made greater than that for a 16 bit wide memory by adding pre-fetch logic to the memory control. Large scale integrated circuit (LSI) error correction devices (ECC's) can be cascaded for use in 32 bit wide memory systems. These error correcting devices have output data latches that store corrected data during memory read cycles, and these latches are individually addressable on a byte basis. The present invention takes advantage of the fact that four bytes, or two words, are stored on each memory read. Additional circuitry can be added to detect when the currently-accessed byte or word is in the same four byte address space as the last read byte or word. When this condition is detected, the memory is not cycled since the data is already present at the output latches of the ECC devices. The addressed byte, or word, is enabled onto the data bus from the appropriate ECC output latches. The access time of the memory, as seen by the processor in this instance, is much shorter than that required by the fastest 16 bit MOS processors currently available.

Of interest is U.S. Pat. No. 4,156,905 entitled Method and Apparatus for Improving Access Speed in a Random Access Memory by C. J. Fassbender. In that patent, an address having a first and second portion is utilized to address a group of words from memory, using the first address portion. The group of words are stored in output registers and the second address portion is utilized to select particular words contained in the output registers. A number of second address portions may be used in any processor cycle. When a subsequent group of words is to be accessed, a second first address portion is loaded into a pre-fetch register and the previously loaded first address portion is compared with the second first address portion to determine if they are the same. If they are, then the need for loading a group of words into the output registers is eliminated. If they are not the same, a miscomparison signal is generated to clock a new group of words into the output registers. The method and apparatus of the above-referenced patent performs its function adequately, but does require that the address contain two separate portions and a modification in the method of addressing has to be implemented.

In the present invention, the basic system operation remains unchanged from the standard mode, the main difference being the utilization of the probability that the next-to-be-accessed word has previously been accessed and appears somewhere within the hardware of the computer system.

SUMMARY OF THE INVENTION

In the preferred embodiment of the invention, an error checking and correcting device is coupled to receive the data accessed from an addressable memory and to latch the data to its outputs during a memory cycle. A latch adapted to receive the address signals directed to the memory for calling forth data, latches at its output the address appearing at its input during a previous memory cycle. A comparator receives the present memory address and the output of the latch, which constitute the previous memory address, and provides an output signal indicative of the presence of a match in addresses. The existence of a match signal at the output of the comparator inhibits the occurrence of the next memory cycle and activates a decoder coupled to the output of the ECC device to transfer, to the computer system bus, the data latched at the output of the ECC device. If a match in addresses is not made, a non-compare signal allows the memory to proceed to its next cycle, thereby loading different data into the ECC device.

From the foregoing, it can be seen that it is a preferred object of the present invention to provide an apparatus for accessing memory in a highly efficient manner.

It is a further object of the present invention to provide an apparatus to eliminate repetitive accessing of the memory.

It is a further object of the present invention to improve the speed of memory access while using a minimum number of additional hardware components.

These and other objects of the present invention will become more apparent when taken in conjunction with the following description and drawings, wherein like characters indicate like parts and which drawings form a part of the present invention.

DESCRIPTION OF THE PREFERRED EMBODIMENT

Figure 1:
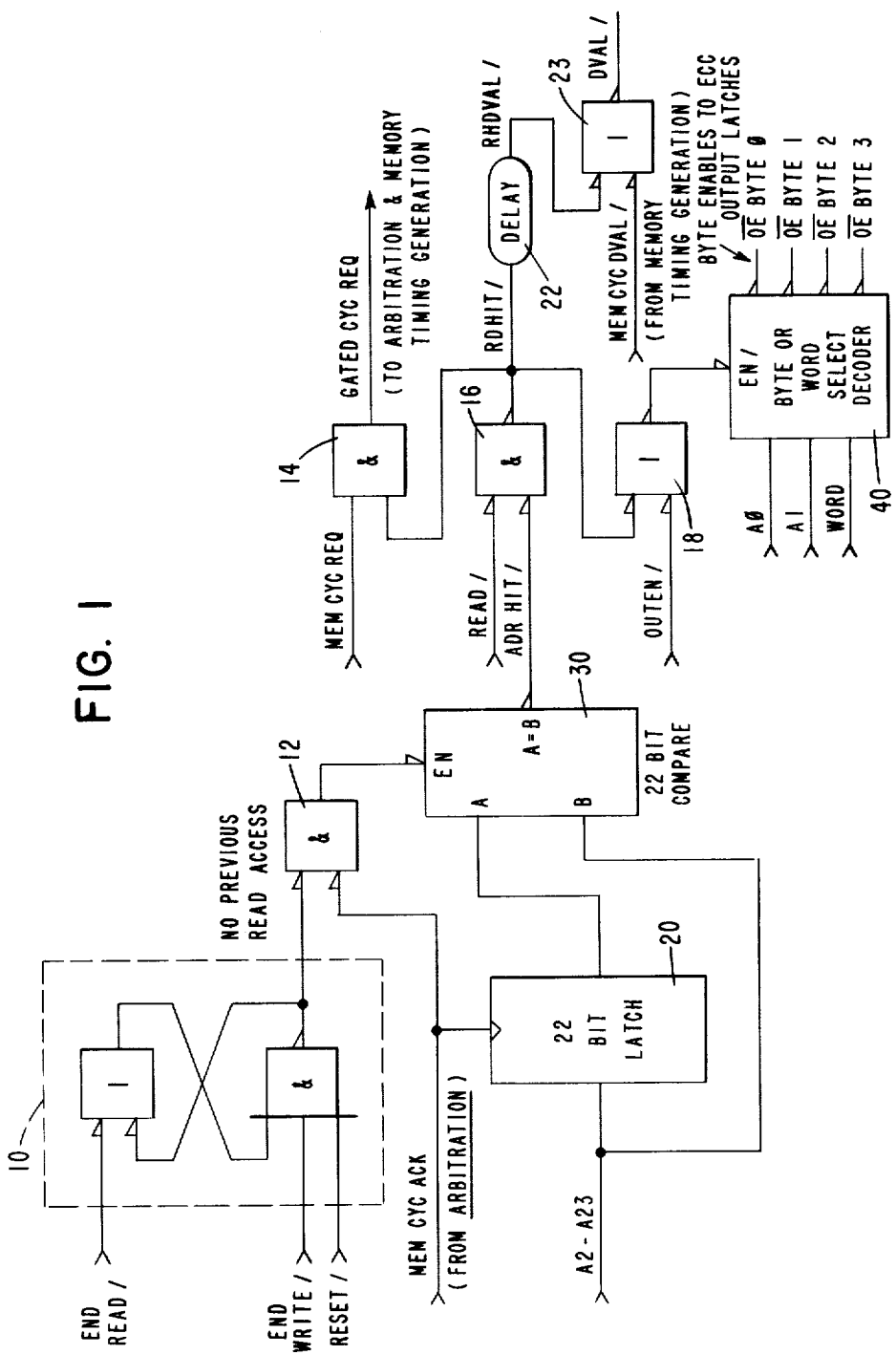
FIG. 1 is a block diagram, partially in logic level form, illustrating a first portion of the preferred embodiment of the invention.
Figure 3:
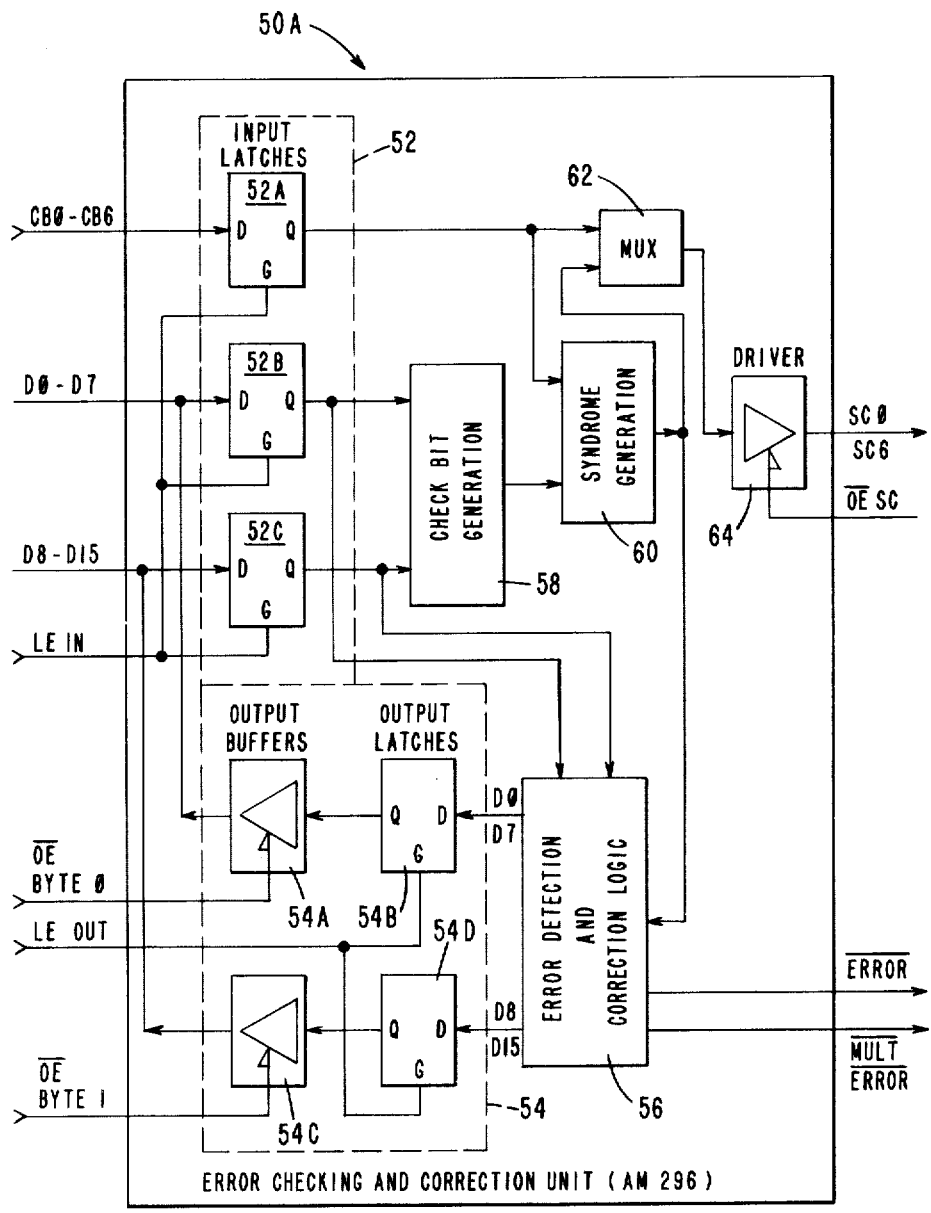
FIG. 3 is a block diagram, partially in logic level form, illustrating in more detail one of the blocks shown in FIG. 2.
Figure 4:
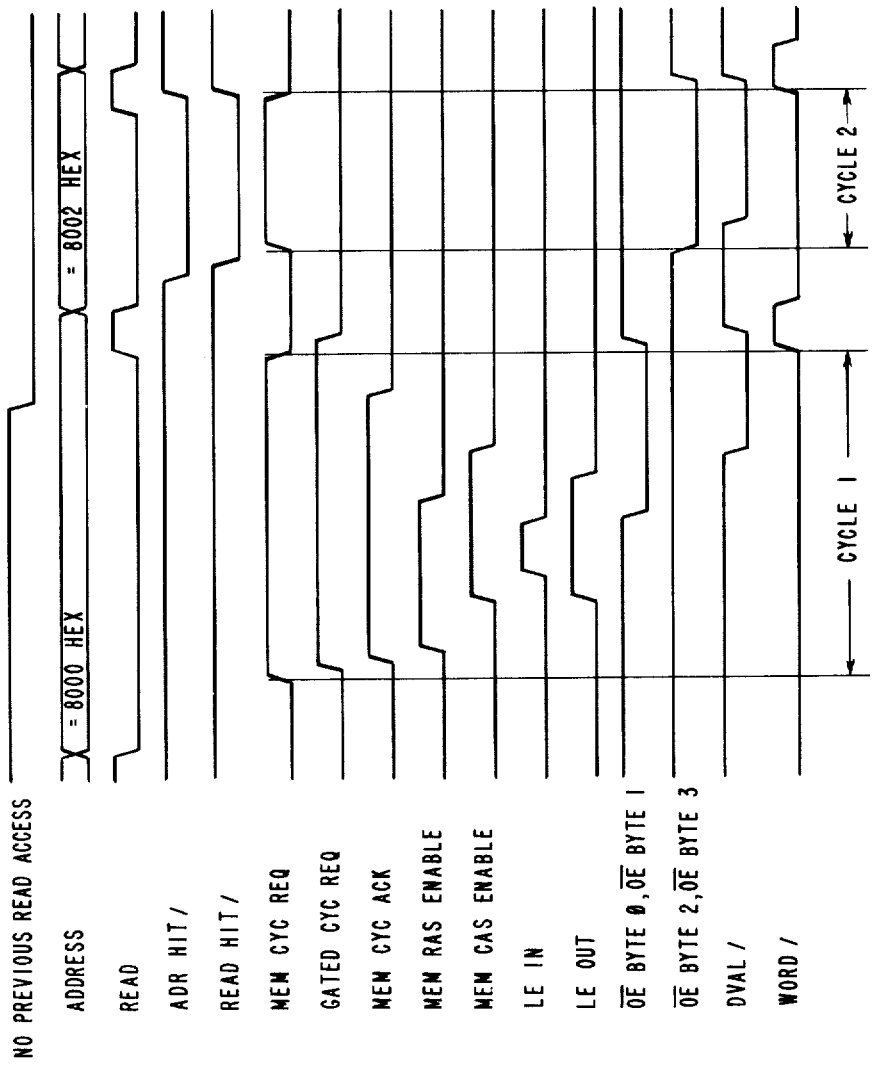
FIG. 4 illustrates the waveforms present at labeled points in the preferred embodiment of the invention.

Referring to FIG. 1 in conjunction with the waveforms of FIG. 4, a latch 10 receives as its inputs the signals END READ, END WRITE and RESET. The latch's output is a signal labeled NO PREVIOUS READ ACCESS. The latch is cleared on power up, or system reset, by the RESET signal. At the end of each read cycle, the END READ signal sets the latch, indicating in a 32 bit system that four new bytes have been latched into the ECC's output latches (shown in FIG. 3). At the end of a write cycle, the signal END WRITE will clear the latch indicating that data in memory is different from the data in the ECC's output latches.

Figure 2:
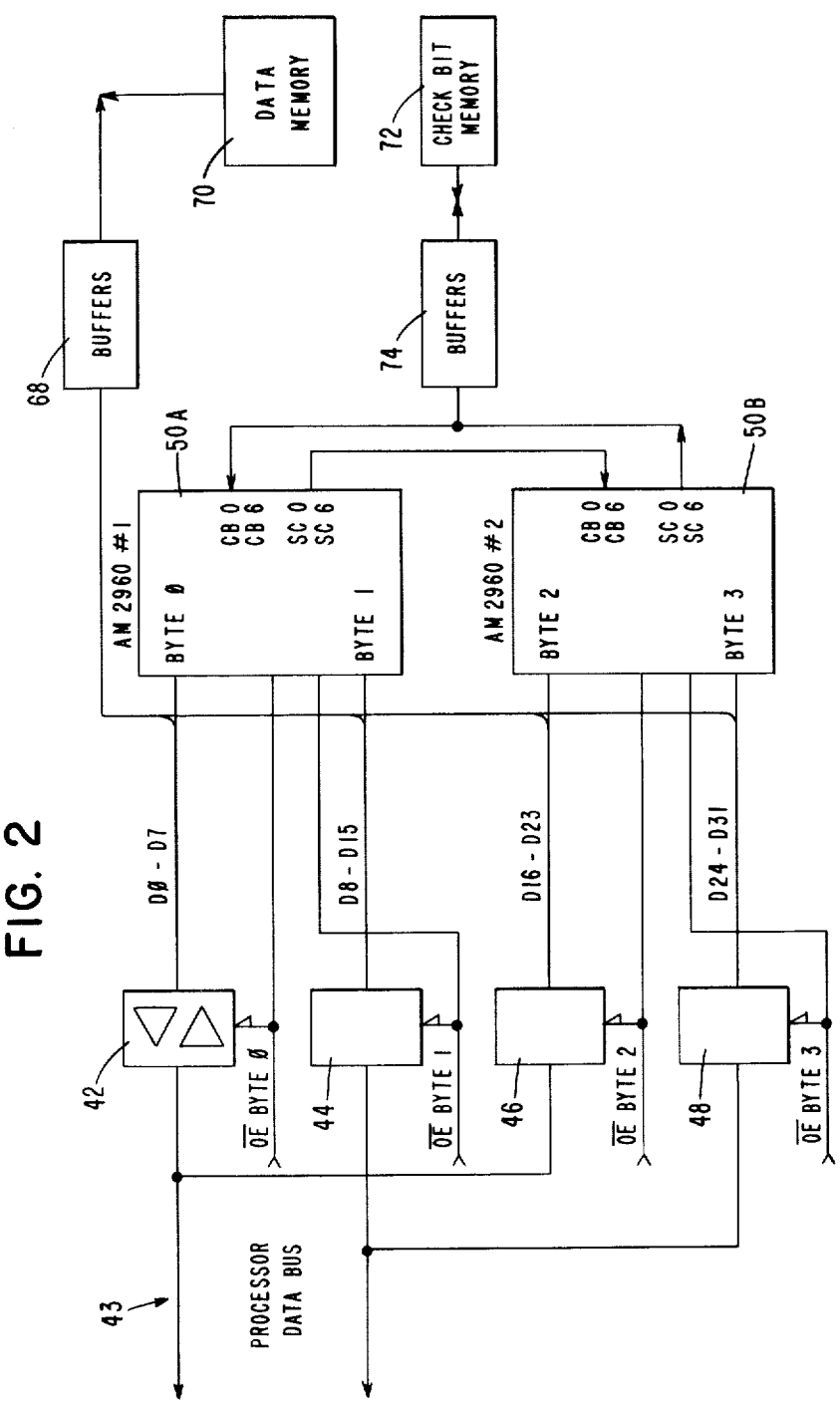
FIG. 2 is a block diagram, partially in logic level form, illustrating a second portion of the preferred embodiment of the invention.

A 22 bit latch 20 receives as its inputs the 22 memory address bits, A2-A23. Additionally, there is provided a signal MEM CYC ACK. The MEM CYC ACK signal is active each time the memory is cycled. The latch 20 stores the accessed memory address bits upon being activated by the presence of the MEM CYC ACK signal. A 22 bit comparator 30 receives at its inputs the previous cycle's 22 address bits from the output of latch 20 and the 22 present address bits. The comparator compares each of these bits to determine if there is a match, if so the comparator, when enabled, will provide an output signal ADRHIT. In addition, the comparator is enabled by the output signal from an AND gate 12. The inputs to AND gate 12 are the output signal from the latch 20 and the MEM CYC ACK signal. If the previous memory cycle was a READ, the output of AND gate 12 will be low and the output signal from the comparator 30 will be the address hit signal ADRHIT which goes active (low) indicating an access to the same four bytes that have previously been latched into the ECC device is presently requested. If the present cycle is a READ, a READ signal is addressed to the input of an AND gate 16 along with the ADRHIT signal. The output signal from AND gate 16 is the RD HIT signal which will go active (low). The output signal from AND gate 16 is directed as inputs to AND gate 14, delay element 22, and NAND gate 18. When the RD HIT signal is low, AND gate 14 will be inhibited from activating the gated cycle request signal, GATED CYC REQ, which appears at its output when a MEM CYC REQ input signal is present at its input. The GATED CYC REQ signal is directed to the data memory 70 (FIG. 2) and will initiate a memory cycle when an address hit is not detected. Instead, a decoder 40 will be enabled by the output signal from NAND gate 18, enabling signals $\overline{OE}$ BYTE $\emptyset$-3 to the respective gate latches 54 (FIG. 3) in the ECC device 50A and 50B (FIG. 2). The decoder 40, in the preferred embodiment, was a 2-to-4 decoder having the general TTL designation 74S139. The NAND gate 18 is enabled by the signal OUTEN which is a timing signal from memory. When enabled, the data corresponding to the addressed bytes is processed onto the computer system's data bus. The inputs $A_0$ and $A_1$ are the two low order address bits which constitute the byte select addresses. In addition, there is a WORD input which selects the word line. If the word line is active, it indicates a 16-bit transfer, that is, two bytes from the ECC output latches. The delay element 22, coupled to the output of the AND gate 16, allows time for data to be enabled onto the data bus. The signal RHDVAL/, indicates to the processor when data is valid after a read cycle. A NAND gate 23 receives the RHDVAL signal and the MEM CYC DVAL/ signal to provide the signal DVAL/ which indicates valid data available independent of the type of cycle performed.

Referring now to FIG. 2, wherein the signals emanating from the decoder 40, denoted $\overline{OE}$ BYTE 0-3 are directed as enabling inputs to bidirectional drivers 42, 44, 46 and 48, respectively. In addition, each of these signals is directed to associated error checking and correcting code devices 50A and 50B which are identical in construction and which are shown in further detail in FIG. 3. The bidirectional drivers when enabled, in a first direction, pass information from the ECC devices 50A and 50B onto the processor data bus 43. When enabled in a second direction, data can pass from the processor bus to the ECC devices. A data memory 70 is coupled by means of buffers 68 to corresponding inputs of the ECC devices and to the processor data bus by means of the drivers. A check bit memory 72 is coupled to the ECC devices by means of buffers 74. In the preferred embodiment of the invention, the ECC units were 16 bit error detection and correction units identified by Part No. AM2960 manufactured by Advanced Micro Devices, Inc. which have the capability of being cascaded to form a 32 bit device.

In FIG. 3, there is disclosed, in block diagram form, one 16 bit ECC device. The error check and correction circuit 50A is shown comprised of a block of input latches 52, a block of output latches and buffers 54, a check bit generation circuit 58, which feeds a syndrome generator 60, a multiplexer 62, driver 64, and an error detection and correction logic circuit 56.

The input latches are shown consisting of three D-type flip-flops 52A-52C. The input bits to latch 52A are the signals CB0-CB6 derived from the cascaded error detection circuit 50B. The inputs to the latch 52B are the data bits D0-D7. The inputs to the latch 52C are the data bits D8-D15. Each of the input latches 52 are enabled by the signal LE IN. When the signal LE IN is high the signal present on the input of the latches passes through the latches. When the signal LE IN makes a transition from high-to-low the data present on the inputs are latched to the outputs. The outputs from latches 52B and 52C are directed as inputs to the error detection and correction logic circuit 56 and to the check bit generation circuit 58. The data bits $D_0-D_{15}$ received by the error detection and correction logic are checked and corrected if a single bit error exists. The correct data bits $D_0-D_7$ and $D_8-D_{15}$ are directed to the D inputs of output latches 54B and 54D, respectively. The signal LE OUT applied to latches 54B and 54D controls the latches similar to the signal LE IN except that the LE OUT signal activates the latches 54B and 54D shortly after the input latches 52 are activated to permit the data received by the input latches, and error checked by the error detection and correction logic 56, to be passed back to the processor bus. The outputs of latches 54B and 54D are directed as inputs to output buffers 54A and 54C respectively. These output buffers are enabled by the $\overline{OE}$ BYTE 0 and $\overline{OE}$ BYTE 1 signals, respectively. The output buffers are coupled to the corresponding input-output lines labeled $D_0-D_7$ and $D_8-D_{15}$.

In operation then, when the data bits appearing at the output of the error detection and correction logic circuit are certain to be the bits associated with the address that is next desired by the processor, the output buffers are enabled and the data bits are passed on to the data bus. Check bit generation and syndrome bit generation is well-known in the art and is not discussed in further detail. The multiplexer 62 activated by the level of the signal at the output of latch 52A directs the output of the syndrome generator to driver 64 which, upon receiving an enabling signal, $\overline{OE}$ SC, provides the syndrome bits SG0-SG6 at its output which syndrome bits are coupled to the associated ECC unit 50D. When the signal $\overline{OE}$ SC is high partial syndrome bits are passed from the ECC element 50B to the ECC element 50A. When the signal $\overline{OE}$ SC goes from high to low all of the syndrome bits are made available to the buffer 74 and check bit memory 72. The error checking and correction logic circuit additionally performs its basic function of providing an output signal $\overline{ERROR}$ indicative of a single error, which error has been corrected or an output signal $\overline{MULTRROR}/$ which indicates the existence of a multi-error, in which case the error is not correctable by the correction logic 56.

Referring now to FIG. 4, wherein the timing waveforms associated with the operation of the preferred embodiment are shown. During cycle 1, assuming the previous cycle was a write cycle, and that the error correction circuit did not contain valid data. The memory is cycled and a 32 bit word at location 8000 HEX (bytes 8000-8004) is latched into the input latches on the falling edge of the signal LE IN. The processor is requesting two bytes since WORD is active, so $\overline{OE}$ byte 0 and $\overline{OE}$ byte 1 are enabled and steered onto the processor data bus. In cycle 2, operation is another word read by the processor requesting bytes 8003 and 8004, which are already stored in the error checking and correction logic 56. The memory cycle is inhibited and signals $\overline{OE}$ byte 2 and $\overline{OE}$ byte 3 enable these two bytes onto the data bus. This cycle is substantially shorter than cycle 1, since memory is not accessed.

Signal Definitions

CB0-CB7—Check bit inputs from memory
SC0-SC7—Check bit outputs on write cycles or syndrome outputs on read cycles
D0-D7—Bi-directional data to/from memory (byte 0)
D8-D15—Bi-directional data to/from memory (byte 1)
LEIN—Latch control for check bit and data input latches
$\overline{OESC}$—Output control for syndrome check bit driver
LEOUT—Latch control for data output latches (both byte 0 and byte 1)
$\overline{OE}$ BYTE 0—Output control for byte 0 output buffer
$\overline{OE}$ BYTE 1—Output control for byte 1 output buffer
  Note 1: Two AM2960 devices are cascaded for the 32-bit memory system in which this prefetch logic is used. $\overline{OE}$ BYTE 2 refers to the output control for the lower byte (D16-D23) in the second AM2960, while $\overline{OE}$ BYTE 3 refers to the upper byte (D24-D31) in the second AM2960.

While there has been shown what is considered to be the preferred embodiment of the invention, it will be manifest that many changes and modifications can be made therein without departing from the spirit and scope of the invention. It is intended, therefore, in the annexed claims, to cover all such changes and modifications as may fall within the true scope of the invention.

We claim:

1. A prefetch circuit for a computer system of the type incorporating an addressable memory and a system bus comprising:

an error correcting means for receiving memory addressed data and for providing error correction where appropriate, said error correcting means storing said memory addressed data for at least one memory cycle;

storing means for receiving the memory address which accessed the data stored in said error correcting means and for storing the address received during the previous memory cycle;

comparator means adapted to receive the memory address stored in said storing means, and the present memory address, said comparator means providing an output signal indicative of the presence of a match in addresses; and decoder means responsive to the output signal from said comparator means and coupled to said error correcting means for enabling said error correcting means for placing said memory addressed data stored therein onto the system bus as the data addressed by the present memory address.

2. A prefetch circuit according to claim 1 and further comprising:

latching means for receiving signals indicative of a read memory cycle and a write memory cycle for providing an enabling signal to said comparator means when the previous memory cycle was a read cycle.

3. The prefetch circuit according to claim 1 and further comprising:

logic means coupling said comparator means to said decoder means, said logic means adapted to receive a signal indicative of the occurence of a memory read cycle and to enable said decoder means when said comparator means provides said output signal in conjunction with a memory read cycle.

4. The prefetch circuit according to claim 1 and further comprising:

driver means coupling said error correcting means to the system bus in response to signals from said decoder means.

5. A prefetch circuit for a computer system of the type that utilizes an addressable memory and a system bus comprising:

first means for storing memory accessed data for at least one memory cycle;

second means for receiving and storing the address corresponding to the accessed memory data;

third means coupled to said second means for comparing the stored address with a present memory address to provide a match signal if a match exists; and fourth means responsive to said match signal for coupling the stored memory accessed data onto the system bus, thereby eliminating a memory access.

6. The prefetch circuit according to claim 5 wherein said first means is an error checking and correction means.

7. The prefetch circuit according to claim 5 and further comprising:

latching means for receiving signals indicative of a read memory cycle and a write memory cycle for providing an enabling signal to said third means when the previous memory cycle was a read cycle.

8. The prefetch circuit according to claim 5 and further comprising:

logic means coupling said third means to said fourth means, said logic means adapted to receive a signal indicative of the occurence of a memory read cycle and to enable said fourth means when said third means provides said match signal in conjunction with a memory read cycle.

9. The prefetch circuit according to claim 5 and further comprising:
driver means coupling the output of said first means to the system bus in response to signals from said fourth means.

* * * * *